United States Patent
Simon

[11] Patent Number: 5,988,841
[45] Date of Patent: Nov. 23, 1999

[54] MULTIPLE BEAM PROJECTION LIGHTING SYSTEM

[76] Inventor: Jerome H. Simon, 70 Sumner St., Newton Centre, Mass. 02159

[21] Appl. No.: 08/733,514

[22] Filed: Oct. 18, 1996

Related U.S. Application Data

[60] Provisional application No. 60/005,621, Oct. 19, 1995.
[51] Int. Cl.[6] ............................................. F21V 8/00
[52] U.S. Cl. ..................... 362/551; 362/576; 362/268; 362/297; 362/329; 362/346; 362/147
[58] Field of Search ............................ 362/32, 282, 283, 362/284, 346, 277, 281, 319, 322, 324, 268, 323, 300, 307, 327, 328, 329

[56] References Cited

U.S. PATENT DOCUMENTS

| | | | |
|---|---|---|---|
| 3,848,119 | 11/1974 | Masson et al. | 362/33 |
| 4,064,425 | 12/1977 | Masson | 362/33 |
| 4,933,813 | 6/1990 | Berger | 362/32 |
| 5,043,850 | 8/1991 | Dreyer, Jr. | 362/32 |
| 5,276,592 | 1/1994 | Henkes | 362/61 |
| 5,483,427 | 1/1996 | Dealey, Jr. et al. | 362/32 |

*Primary Examiner*—Thomas M. Sember
*Attorney, Agent, or Firm*—Perkins, Smith & Cohen, LLP; Jerry Cohen; Harvey Kaye

[57] ABSTRACT

In a light distribution system for producing a series of light beams remote from a quasi point source, a light collection means, a conveyance means having an axis, and a series of illumination directors are provided. The light collection means projects light from the quasi point source through the conveyance means to the series of illumination directors. The illumination directors are axially displaced from one another, and each illumination director directs a beam away from the system to provide illumination. At least one of the illumination directors comprises a beam splitting reflector having a predetermined ratio of reflection to transmission. Consequently, each illumination director in the series provides a measured amount of brightness in a predetermined ratio to the other illumination directors in the series. The light collection means and said illumination directors define brightness and size of the beams projected from the system.

22 Claims, 5 Drawing Sheets

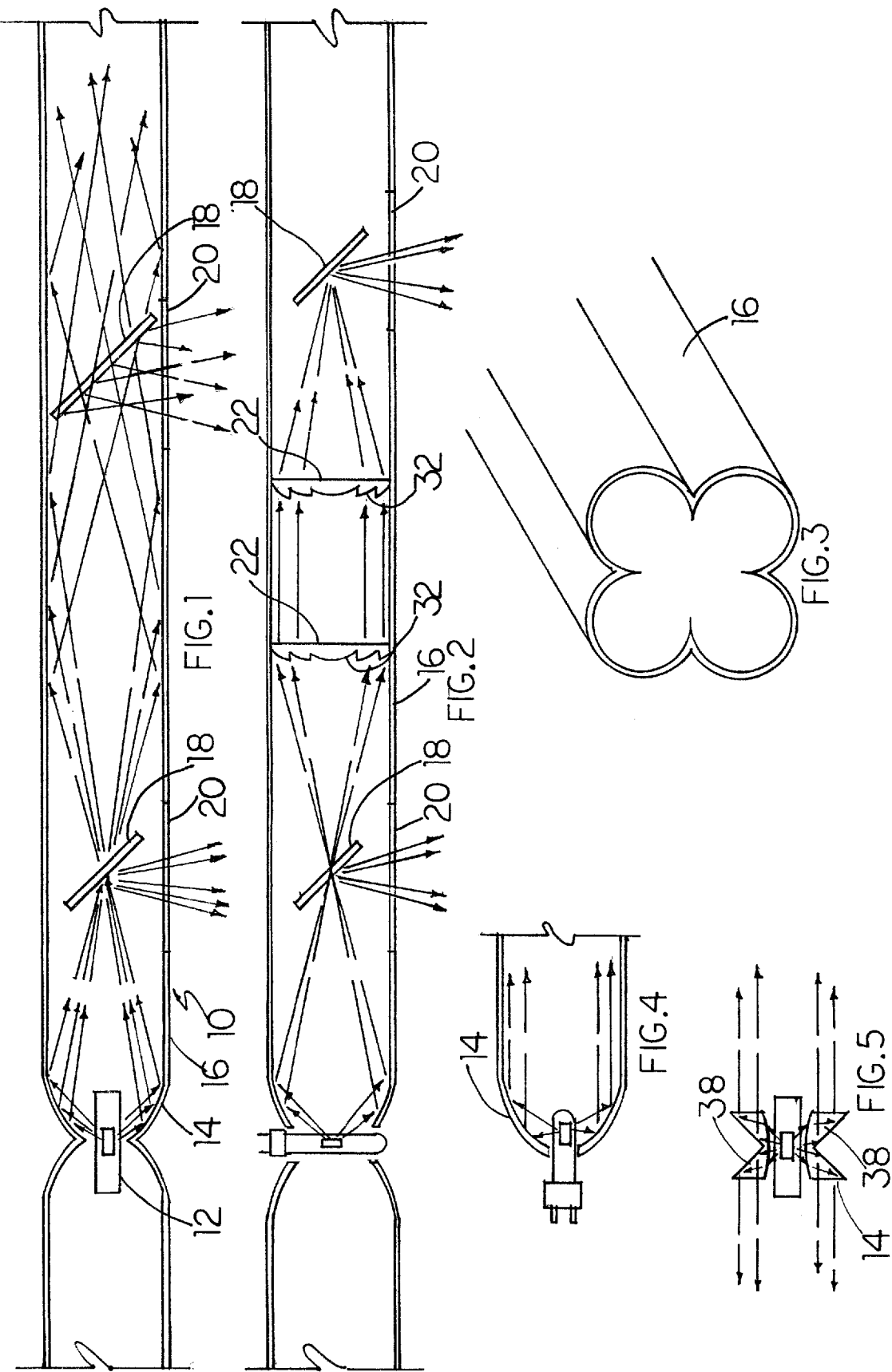

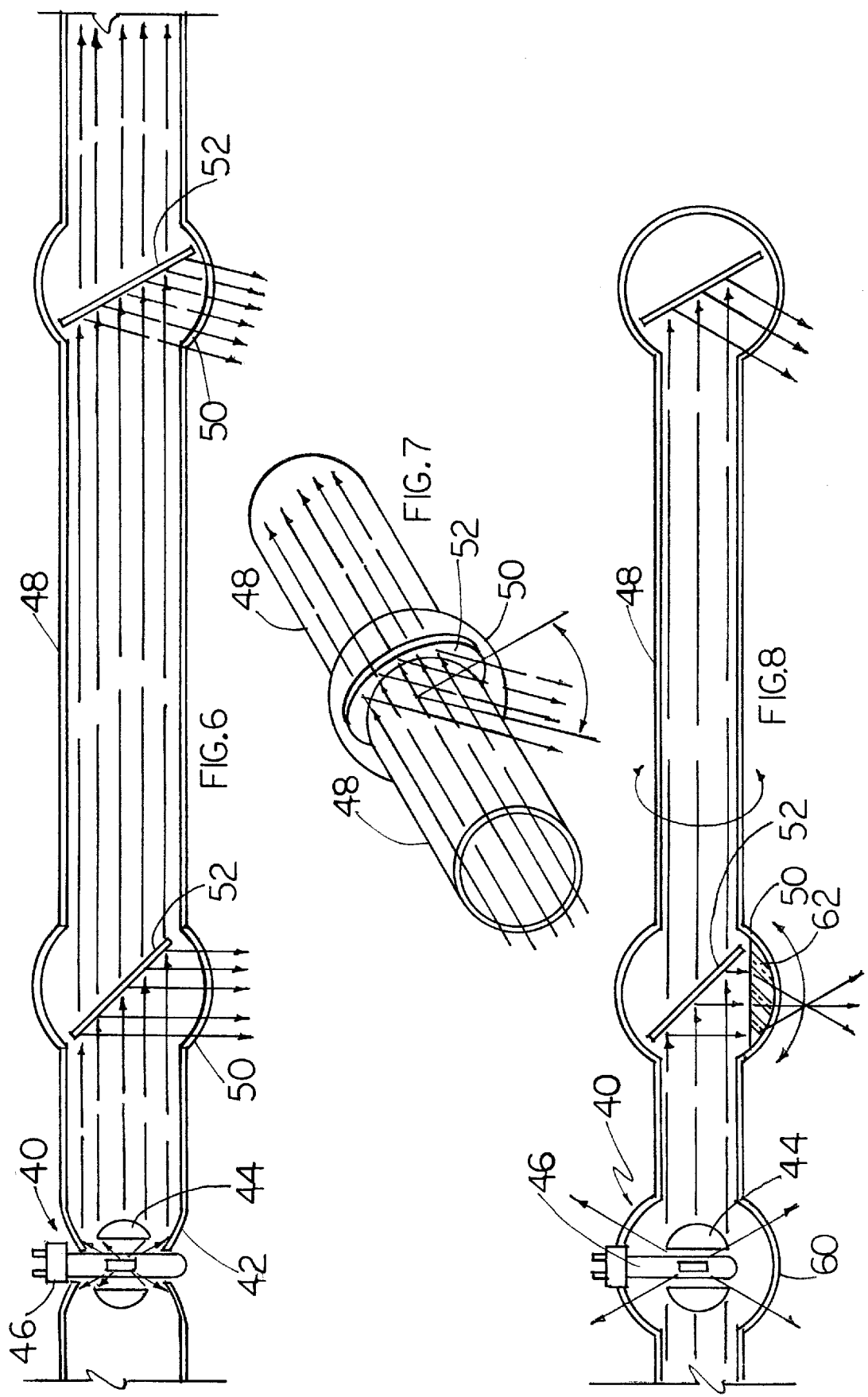

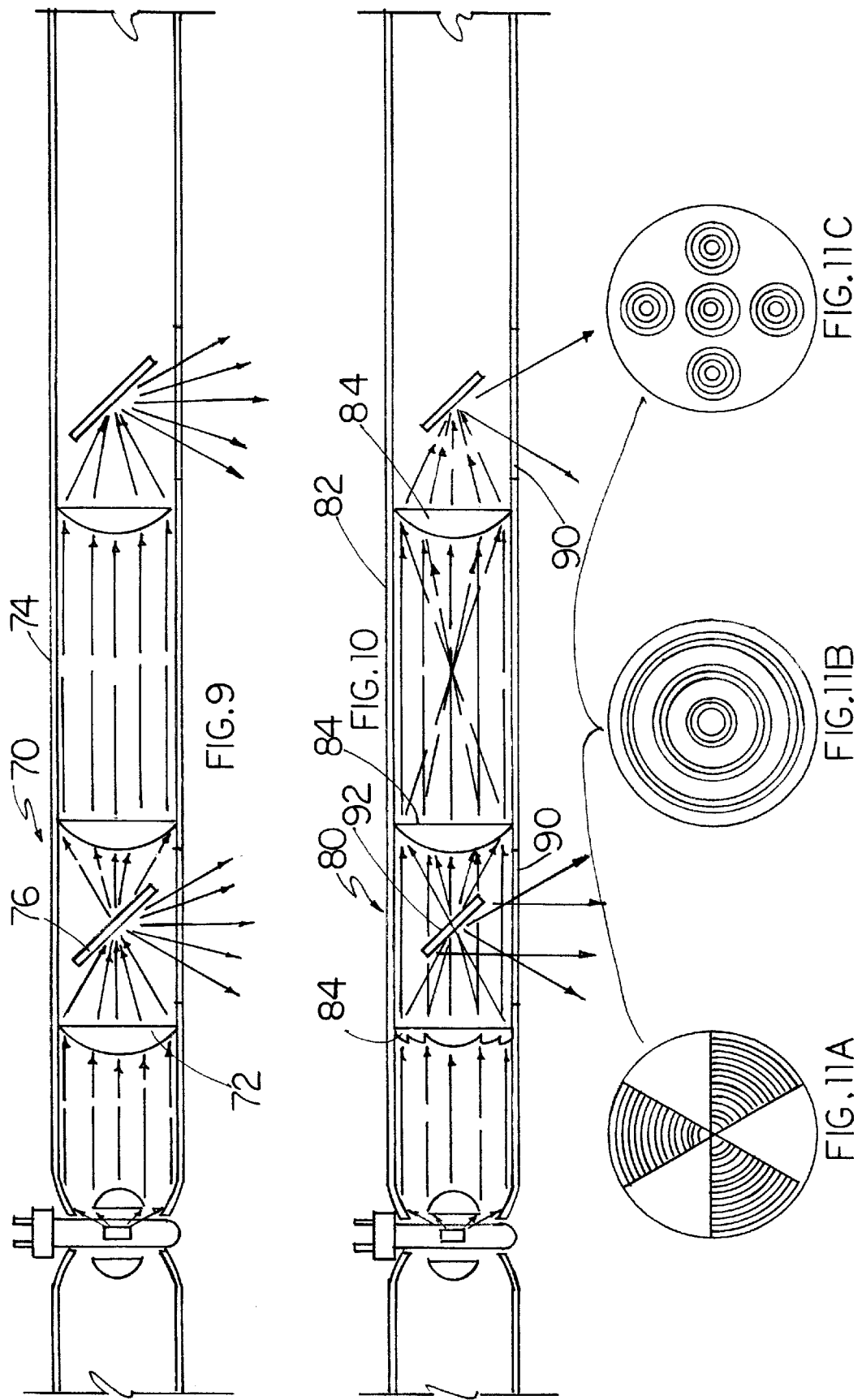

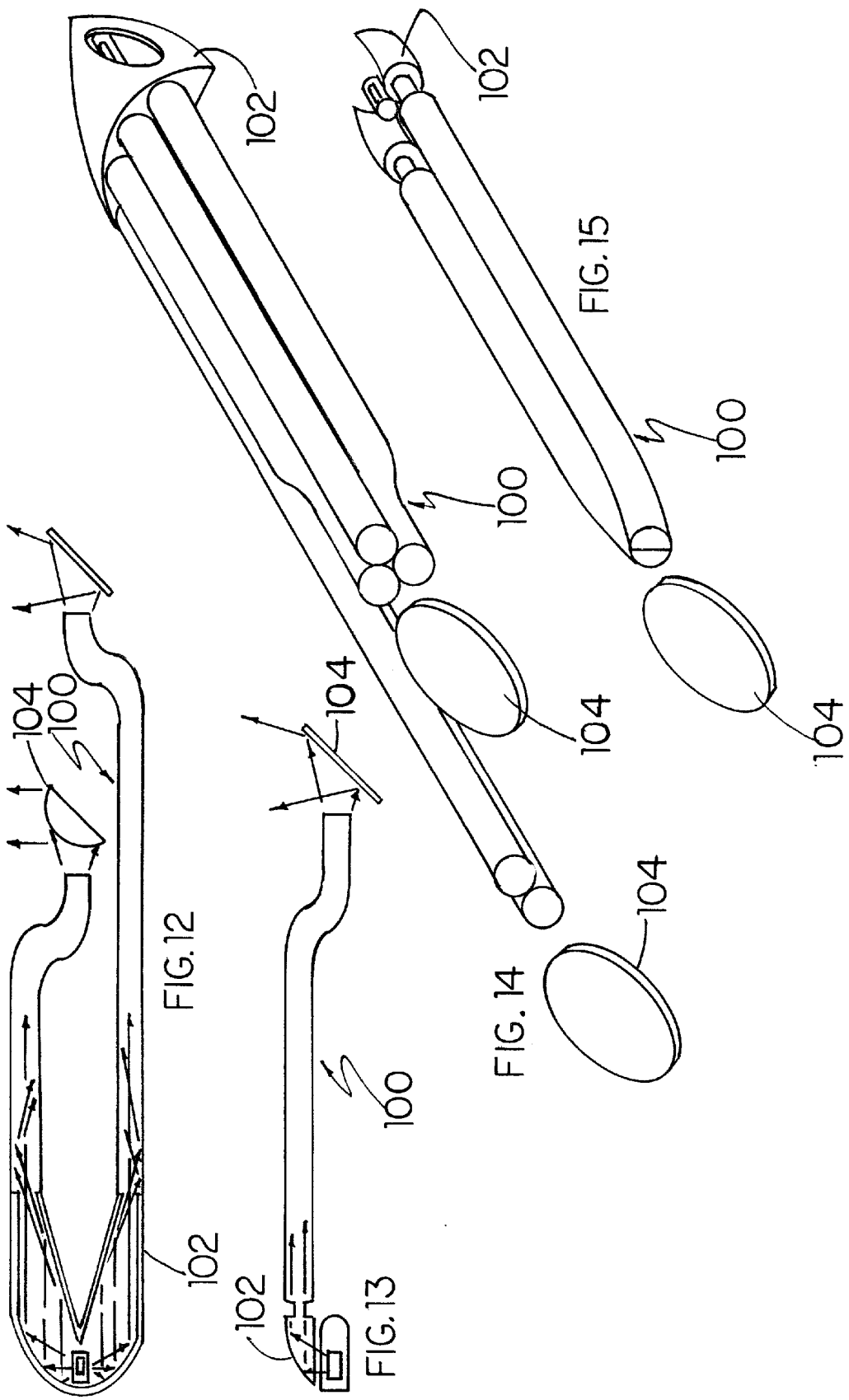

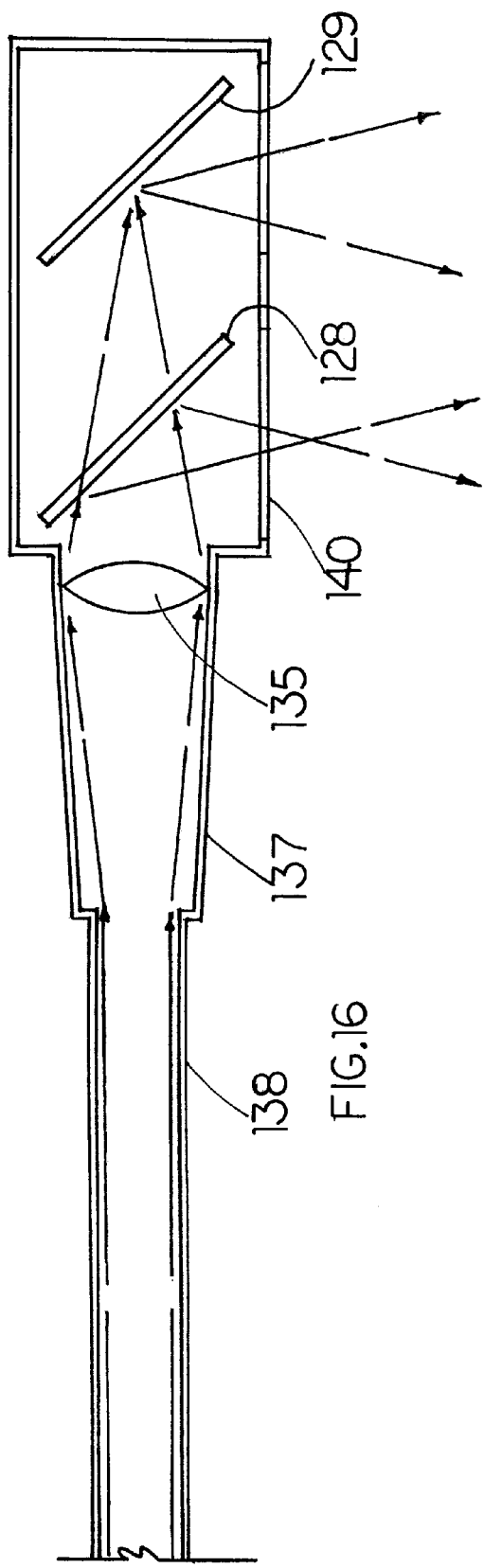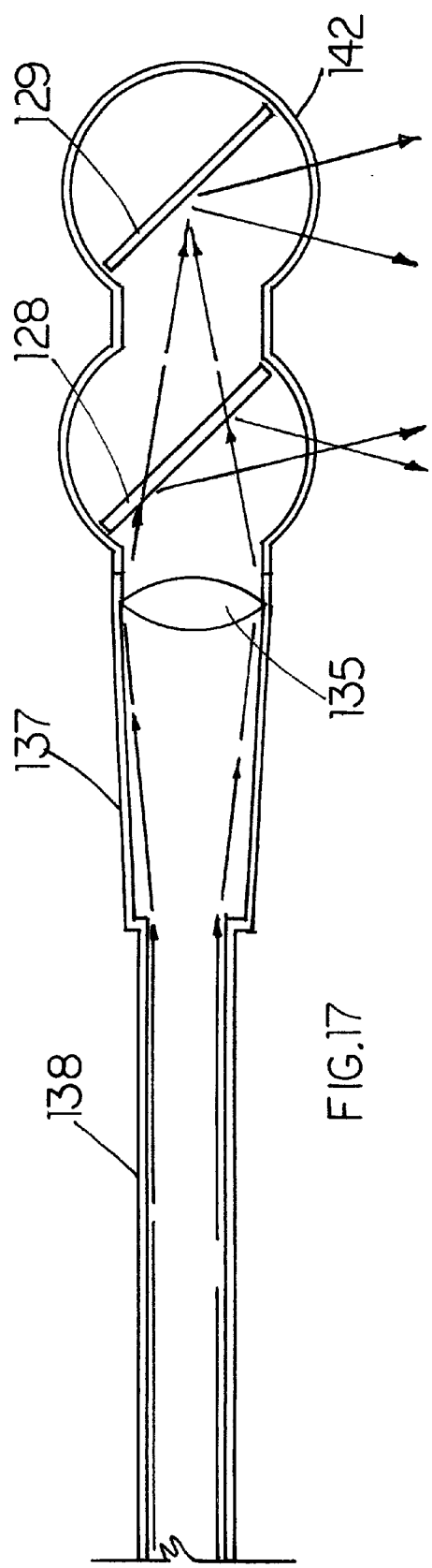

MULTIPLE BEAM PROJECTION LIGHTING SYSTEM

This application is related to provisional application No. 60/005,621 filed Oct. 19, 1995.

FIELD OF INVENTION

This invention relates generally to a multiple beam projection lighting system, and more particularly to a system comprising a lineal series of illumination directors.

BACKGROUND OF THE INVENTION

It is known to provide a system for producing a plurality of beams from a collimated or focused quasi point source. It is further desirable to be able to produce further illumination from the path of an individual beam.

SUMMARY OF THE INVENTION

It is therefore a general object of the present invention to provide a system in which a series of directable beams from locations along a lineal light conveyance pathway of a first light beam.

It is a more specific object of the present invention to provide a system of the type described in which each directable beam in the series is of a controlled brightness with respect to a next beam.

Briefly stated, in accordance with the present invention, there are provided, in a light distribution system for producing a series of light beams remote from a quasi point source, a light collection means, a conveyance means having an axis, and a series of illumination directors. The light collection means project light from the quasi point source through the conveyance means to the series of illumination directors. The illumination directors are axially displaced from one another, and each illumination director directs a beam away from the system to provide illumination. At least one of the illumination directors comprises a beam splitting reflector having a predetermined ratio of reflection to transmission. Consequently, each illumination director in the series provides a measured amount of brightness in a predetermined ratio to the other illumination directors in the series. The light collection means and said illumination directors define brightness and size of the beams projected from the system.

BRIEF DESCRIPTION OF THE DRAWINGS

The means by which the foregoing objects and features of invention are achieved are pointed out with particularity in the claims forming the concluding portion of the specification. The invention, both as to its organization and manner of operation may be further understood by reference to the following description taken in connection with the following drawings.

Of the drawings:

FIG. 1 is a pictorial illustration of the multiple beam projection lighting system of this invention including a plurality of predetermined spaced apart directional light distribution means;

FIG. 2 is a pictorial representation of another embodiment of this invention including means for varying the spacing of the directional light distribution means;

FIG. 3 is a pictorial view of a further embodiment of the light conveyance means utilized with the multiple beam projection lighting system of this invention;

FIG. 4 and FIG. 5 are pictorial illustrations of alternate embodiments of the collection/projection units utilized in the multiple beam projection lighting system of this invention;

FIG. 6 is a pictorial illustration of a further embodiment of the multiple beam projection lighting system of this invention including beam splitting directional light distribution means ;

FIG. 7 is a pictorial representation illustrating the beam splitting directional light distribution means utilized with the present invention;

FIG. 8 is a pictorial representation of an another embodiment of the present invention illustrating a modified collection/projection unit;

FIG. 9 is a pictorial representation of a further embodiment of the present invention including focusing lenses therein;

FIG. 10 is a pictorial representation of an even further embodiment of this invention incorporating a variety of beam shaping means therein;

FIGS. 11A, 11B and 11C are a variety of different types of window elements which permit a variety of different patterns of light to pass therethrough;

FIG. 12 is a pictorial representation of an embodiment of the present invention utilizing solid beam conveying means together with a unique collection/projection unit;

FIG. 13 is a pictorial representation of another embodiment of a solid beam conveying means incorporated within the present invention and including an integral collection/projection unit;

FIG. 14 is a further embodiment of the present invention incorporating therein a plurality of solid beam conveying means;

FIG. 15 is a still further embodiment of the present invention incorporating therein joined together solid beam conveying means; and FIGS. 16 and 17 are each a further embodiment comprising first and second reflectors sharing the same diminished bean diameter formed by a focusing convex lens at a distal portion of conveyance means.

DETAILED DESCRIPTION OF THE PREFERRED EMBODIMENTS

The present invention provides for a multiple beam projection lighting system capable of producing high efficiency, low maintenance, accent lighting for commercial, visual, merchandising and residential use. The lighting system of the present invention is capable of providing light to be projected from predetermined linear spacing in order to provide a superior alternative to track lighting. The present invention integrates a single high intensity light source within the lighting system thereby replacing the multiple, inefficient light sources of past devices. By utilizing a plurality of unique components the multiple beam projection lighting system of this invention provides uniform, repetitive, directional beam patterns that may be varied in brightness and size.

Referring now to FIG. 1 of the drawings, the multiple beam projection lighting system 10 is made up of the following major components: a light source 12 in the form of a "quasi-point" source, high intensity filament or any other such suitable compact light source; a collection/projection unit 14 surrounding light source 12 that collects light therefrom and projects it in a single or a plurality of directions, and is made of a parabolic or an ellipsoidal configuration or combination thereof, or reflectors or a combination of refractive and/or reflective elements that totally surround the light source 12 and redirect the flux of the source 12; a light conveying means 16 made up of a single or plurality of units or modules which act as a light guide and which may be hollow or solid; a plurality of directional light distribution means 18, which intercept the light beam and redirect a percentage of the beam through a window 20 located in the conveyance means 16.

Directional distribution means 18 may be in the form of a mirror, or segmented type beam splitter, or a mirror in the case of the last of a series of directional distribution means within the light conveying means 16. More specifically, the directional distribution means 18 may be mechanically attached within the conveying means for rotational movement therein so that the beam direction can be controlled. The interior surfaces of conveying means 16, as shown in FIG. 1 are reflective to act as a wave guide in directing the beam through the conveying means. In the embodiment shown in FIG. 2, a series of internal beam shaping and continuity optics 22, in the form of, for example, lenses of various focal lengths, allow for the varied spacing of the directional distribution means 18 by controlling the divergence of the beams within the conveying means 16.

Directional distribution means 18 may also be referred to as illumination directors.

Referring once again to FIG. 1 of the drawings, the collection/projection unit 14 directs the beam of light in a converging manner onto the directional distribution means 18 which can be made of a beam splitter, or a reflector/mirror beam splitter which further projects the beam through window 20 with an evenly distributed predictable divergence . In addition, the predictability of this divergence allows for the continuing passage of the beam along the conveying means 16 toward a second directional distribution means 18 for subsequent projection through a second window 20. One such system of this invention can incorporate efficiently three such direction distribution means 18. As shown in FIG. 1 of the drawings, since the source of light 12 illuminates in two directions a pair of conveying means 16 can be utilized adjacent source 12 in a highly efficient manner, with an evenly distributed predictable diversion of light at each window 20. A plurality of conveying means 16 permit the efficient distribution of light from a single source.

An alternative embodiment of the present invention is shown in FIG. 2 of the drawings in which it is possible to vary the spacing between the directional distribution means 18 by incorporating therein a series of lenses of varied focal lengths 32 and 34 to control the divergence of the-beam of light passing through the conveying means. These lenses 32, 34 can also act to collimate the beam and then reconverge the beam at a directional distribution means 18. The lenses 32 and 34 are each spaced at a preselected distance from each other and with respect to the distances selected for locations the illumination directors.

FIG. 3 illustrates a further embodiment of the conveying means 16 having rounded sections or arc segments that conveys the light therethrough. Further the conveying means 16 controls divergence of the beam by being totally reflective on the interior surface thereof.

FIGS. 4 and 5 illustrate even further embodiments of the collection/projection units 14 utilized with the present invention. In particular, FIG. 5 illustrates the utilization of lenses 38 as collection/projection means.

Further embodiments of the present invention are illustrated in FIGS. 6–8 wherein the collection/projection unit 40 is in the form of a matched parabolic and aspheric lenses 42 and 44, respectively for maximum light collection and projection of a uniform beam cross section from source 46. Also illustrated in FIGS. 6–8, the conveying means 48 is made of a unique configuration wherein the windows 50 are of a bubble-like design enable a unique directional distribution means 52 to accept the entire cross-section of the beam as it passes therethrough. Even at 15° to the central axis of projection, the directional distribution means 52 will still intercept the entire beam cross-section. In this embodiment of the present invention the directional distribution means 52 is, for example, in the form of a beam splitter which is rotatable in order to project the beam through the bubble-like configured windows 50. Due to the geometry need to provide for the described 15° angle, the directional distribution means 52 will be at least twice the diameter of the conveying means 48. The conveying means 48 may vary in length in between the plurality of directional distribution means 52. As with the embodiment of FIG. 1 the present invention can incorporate a plurality of such conveying means attached together in order to provide uniform distribution of light in a highly efficient and extremely cost effective manner.

FIG. 7 of the drawings clearly illustrate the relationship between the directional distribution means 52 and the windows 50. Rotation of the directional distribution means 52 can be in the axial or radial direction and be accomplished by a mechanical mechanism or a magnetic suspension system, totally unaffected by external conditions.

FIG. 8 of the drawings illustrate another embodiment of the present invention in which the collection/projection unit 40 is designed as to collimate a portion of the light emanating from source 46, with the remaining light therefrom directed out of a secondary window system 60. Furthermore, the bubble like windows 50 can have a lens 62 incorporated therein as well as being movable either independently of or with respect to the directional distribution means 52. Note, lens 62 moves twice the number of degrees as the directional distribution device 52 move in the pivot to axial movement. Directions of rotation are indicated by the arrows in FIG. 8.

A still further embodiment of the present invention is illustrated in FIG. 9 of the drawings wherein focusing lenses 72 are utilized within the conveying means 74 in order to direct the collimated light beam onto the directional distribution means 76. These distribution means 76 may be similar to the type utilized with the embodiment of FIG. 1. Incorporating lenses within the system can effectively alter the size of the beams as well as be utilized in order to effectively vary the spacing between the directional distribution means.

The embodiment of FIG. 10 of the drawings includes collimating means together with a series of lenses that permit the utilization of both focused and collimated beams for the effective distribution of light from the conveying means 82. In addition, each of the windows 90 may incorporate therein a series of lenses as illustrated in FIGS. 11A, 11B, and 11C such as, for example, Fresnel lenses having clear portions cut therein to allow for collimation of the projected beam. Furthermore, the lenses 84 maybe segmented geometrically into focusing and window segments thus allowing a percentage of the beam to be focused onto the directional distribution means 92 and allowing a percentage of light to be conveyed to the next directional distribution means.

The embodiments of this invention illustrated in FIGS. 12–15 of the drawings illustrate the utilization of solid conveying means 100 incorporated within the multiple beam projection lighting system of this invention. The solid outside surfaces conveying means 100 would be polished for total internal reflection. Also incorporated therewith are uniquely designed collection/projection units 102 which are capable of projecting light into a concentric ring so as to be accepted within a series of solid conveying rods as illustrated in FIG. 14 of the drawings. In addition, the collection/projection unit 102 can be pressed within the solid rods so as provide for a unitary configuration as shown in FIG. 13 and FIG. 15 of the drawings. The light distribution means 104 in FIGS. 12–15 are located external of the conveying means 100 and are rotatable so as to direct or project light in a predetermined direction.

FIGS. 16 and 17 are each a further embodiment comprising first and second light distribution means/reflectors 128 and 129 respectively sharing the same diminished beam diameter formed by a focusing lens 135 at a distal portion 137 of conveyance means 138. Each light distribution means/reflector 128 and 129 reflects an image created by the lens 135, which is preferably concave. The convex lens 135 is preferably located a focal length from an aperture in conveyance means. Each light distribution means 128 and 129 is mounted for independent rotation. In FIG. 16, the light distribution means 128 and 129 are both mounted in a cylindrical window 140. In FIG. 17, light distribution means 128 and 129 are mounted in respective separate spherical portions 143 and 144 a complex bubble window 142.

The entire multiple beam projection lighting system of the present invention may be manufactured as a single body or in modules An example of the modularity of design maybe one in which the modules are as follows: a collection/projector module, a conveying means module or modules and a directional distribution module or modules. All modules may be interchangeable and all of the interchangeable parts which make up all of the modules, that is, the collector/projector module, the conveyance module(s) or directional distribution module(s) maybe completely interchangeable, one with the other. All of the embodiments shown in all of the drawings are interchangeable such that the various collections/projection modules, the conveyance modules and the directional distribution modules may all be used one with the other.

Furthermore, the conveyance modules can be of varying lengths so that the distance between projected beams may be varied by alternating or varying the distance between the directional distribution means or modules. In addition, the solid conveying means utilized within the multiple beam projection lighting system of this invention shown in FIGS. 12–15 could be in the form of a solid glass refracting compensating ring which would allow for a small diameter of the conveying means.

Although the invention has been described with reference to particular embodiments, it will be understood that this invention is also capable of further and other embodiments within the spirit and scope of this invention.

What is claimed as new and desired to be secured by Letters Patent of the United States is:

1. A light distribution system for producing a series of light beams remote from a quasi point source comprising:
    a light collection means,
    a conveyance means having an axis, and
    a series of illumination directors,
    said light collection means for projecting a light beam from the quasi point source through the conveyance means to the series of illumination directors,
    said illumination directors being axially displaced from one another, each said illumination director directing a beam away from said system to provide distribution of beams away from each other,
    at least one of said illumination directors comprising a beam splitting reflector having a predetermined ratio of reflection to transmission, whereby each illumination director in the series provides a measured amount of brightness in a predetermined ratio to the other illumination directors in the series, said light collection means and said illumination directors defining brightness and size of the beams projected from the system.

2. The system of claim 1 in which said collection means comprises ellipsoidal reflector means.

3. The system of claim 2 wherein light from said collection means is focused onto a first beam splitting reflector in a first illumination director, said beam splitting reflector reflecting a first portion of the beam away from the axis and transmitting a second portion of the beam, said second portion being refocused to a second illumination director by internal reflection of conveyance means.

4. The system of claim 2 wherein light from said collection means is focused onto a first beam splitting reflector in a first illumination director, said beam splitting reflector reflecting a first portion of the beam away from the axis and transmitting a second portion of the beam, and a second illumination director.

5. The system according to claim 1 wherein said collection means comprises an aspheric collimation lens.

6. A system according to claim 12 wherein light not collected by the aspheric lens is utilized as ambient light at the collection means.

7. A system as in claim 5 wherein said collection means comprises a refractive ring lens.

8. The system according to claim 5 wherein the conveying means has an interior, the interior of said conveying means being specular and surrounding said light beam projected from said collection means for controlling divergence thereof, and wherein said series of illumination directors comprises a series of beams splitting mirrors, each beam splitting mirror being at a respective predetermined distance from said collection means.

9. The system according to claim 1 in which the collection means for each conveyance means comprises an aspheric lens and parabolic reflector providing light collimated along the axis.

10. The system according to claim 9 wherein the conveying means has an interior, the interior of said conveying means being specular and surrounding said light beam projected from said collection means for controlling divergence thereof, and wherein said series of illumination directors comprises a series of beams splitting mirrors, each beam splitting mirror being at a respective predetermined distance from said collection means.

11. The system according to claim 1 wherein the conveyance means is specular, whereby reflectivity is provided between said collection means and a first illumination director and between successive illumination directors.

12. The system of claim 11 wherein said illumination directors comprise a series of beam splitting mirrors disposed at predetermined distances from the collecting means along the axis and wherein said beam splitting mirrors proportionately direct light away from the axis.

13. A system according to claim 12 wherein said light beam projecting through the conveyance means has a cross-section, and a dimension of the beam reflector in each of said illumination directors is at least twice the cross section of the beam transmitted through said conveyance means, whereby the entire cross section of the beam will be intercepted by said reflector over a preselected range of angular dispositions of said reflectors.

14. The system according to claim 1 wherein said conveyance means comprises enclosure means enclosing said reflecting mirrors, whereby dust protection is provided.

15. A system as in claim 1 wherein at least one said illumination director comprises a transparent housing comprising a bubble-like window within which said reflector is mounted for independent movement.

16. A system as in claim 1 comprising first, second and third convex lenses and wherein the beam is focused on the first reflector by the first convex lens and expands and is recollimated by said second convex lens, said second convex lens projecting the beam to said third convex lens to refocus the beam onto a second reflecting surface in a next, axially displaced illumination director.

17. The system of claim 1 further comprising a first convex lens for focusing and transmitting light from said collecting means to said conveyance means, wherein said first lens comprises separate portions in a preselected pattern for transmitting light directly and for focusing light.

18. A light distribution system as defined in claim 1, wherein each said illumination director is movable to direct a beam away from said system as desired to provide dispersed illumination.

19. A system light distribution for producing a series of light beams remote from a quasi point source comprising:
   a light collection means,
   a conveyance means having an axis, and
   a series of illumination directors,
   said light collection means for projecting a light beam from the quasi point source through the conveyance means to the series of illumination directors, said illumination directors being axially displaced from one another, each said illumination director directing a beam away from said system to provide illumination, at least one of said illumination directors comprising a beam splitting reflector having a predetermined ratio of reflection to transmission, whereby each illumination director in the series provides a measured amount of brightness in a predetermined ratio to the other illumination directors in the series, said light collection means and said illumination directors defining brightness and size of the beams projected from the system
   means for focusing an axial beam to have a diminished beam diameter and in which first and second adjacent illumination directors receive substantially the same beam of diminished diameter, the reflectors in each said illumination director being independently rotatable.

20. The system of claim 19 wherein said first and second illumination directors are housed in respective first and second independently movable sections of a housing.

21. A light distribution system for producing a series of light beams remote from a quasi point source comprising:
   a light collection means,
   a conveyance means having an axis, and
   a series of illumination directors,
   said light collection means for projecting a light beam from the quasi point source through the conveyance means to the series of illumination directors, said illumination directors being axially displaced from one another, each said illumination director directing a beam away from said system to provide illumination, at least one of said illumination directors including a beam splitting reflector having a predetermined ratio of reflection to transmission, whereby each illumination director in the series provides a measured amount of brightness in a predetermined ratio to the other illumination directors in the series, said light collection means and said illumination directors defining brightness and size of the beams projected from the system, at least one illumination director including a lens receiving the beam reflected from the reflecting surface and means for moving said lens to remain on axis of said reflected beam upon rotation of said reflecting mirror.

22. A light distribution system for producing a series of light beams remote from a quasi point source comprising:
   a light collection means,
   a conveyance means having an axis, and
   a series of illumination directors,
   said light collection means for projecting a light beam from the quasi point source through the conveyance means to the series of illumination directors, said illumination directors being axially displaced from one another, each said illumination director directing a beam away from said system to provide illumination, at least one of said illumination directors including a beam splitting reflector having a predetermined ratio of reflection to transmission, whereby each illumination director in the series provides a measured amount of brightness in a predetermined ratio to the other illumination directors in the series, said light collection means and said illumination directors defining brightness and size of the beams projected from the system, at least one said illumination director being mounted for rotation about the axis and the reflector therein being mounted for rotation about a reflector axis perpendicular to the axis.

* * * * *